United States Patent [19]
Van Ert et al.

[11] Patent Number: 6,120,090
[45] Date of Patent: Sep. 19, 2000

[54] STRUCTURAL HEADLINER

[75] Inventors: Jack M. Van Ert, Rochester Hills, Mich.; George B. Byma, Haar, Germany

[73] Assignee: Lear-Donnelly Overhead Systems, L.L.C., Novi, Mich.

[21] Appl. No.: 09/200,390

[22] Filed: Nov. 24, 1998

Related U.S. Application Data

[63] Continuation-in-part of application No. 08/801,853, Feb. 21, 1997, abandoned.

[51] Int. Cl.[7] .................................................. B60R 13/02
[52] U.S. Cl. ........................... 296/211; 296/214; 280/751; 454/137; 428/166; 428/188
[58] Field of Search .................................. 296/211, 214; 280/751; 454/136, 137, 138; 428/166, 178, 188

[56] References Cited

U.S. PATENT DOCUMENTS

| | | | |
|---|---|---|---|
| 2,147,059 | 2/1939 | Randall | 296/211 |
| 3,042,446 | 7/1962 | Stahl | 296/214 |
| 3,252,732 | 5/1966 | Squier | 296/214 |
| 3,366,026 | 1/1968 | Herr et al. | 454/137 |
| 3,697,126 | 10/1972 | Tiffin et al. | 296/214 |
| 4,020,207 | 4/1977 | Alfter et al. | 428/138 |
| 4,131,702 | 12/1978 | Alfter et al. | 428/76 |
| 4,150,850 | 4/1979 | Doerfling | 296/214 |
| 4,172,918 | 10/1979 | Doerer | 428/174 |
| 4,188,440 | 2/1980 | Doerer | 428/215 |
| 4,211,590 | 7/1980 | Steward et al. | 156/79 |
| 4,247,586 | 1/1981 | Rochlin | 428/138 |
| 4,256,797 | 3/1981 | Stamper et al. | 428/215 |
| 4,330,584 | 5/1982 | Doerer | 428/91 |
| 4,352,522 | 10/1982 | Miller | 296/214 |
| 4,358,883 | 11/1982 | Gerring | 29/401.1 |
| 4,595,551 | 6/1986 | Maurer | 264/413 |
| 4,600,621 | 7/1986 | Maurer et al. | 428/121 |
| 4,610,478 | 9/1986 | Tervol | 296/214 |
| 4,729,917 | 3/1988 | Symdra et al. | 428/190 |
| 4,840,832 | 6/1989 | Weinle et al. | 428/156 |
| 4,851,283 | 7/1989 | Holtrop et al. | 442/370 |
| 4,957,797 | 9/1990 | Maeda et al. | 428/77 |
| 4,992,320 | 2/1991 | Gower | 428/184 |
| 5,007,976 | 4/1991 | Satterfield et al. | 156/222 |
| 5,026,586 | 6/1991 | Tabor | 428/90 |
| 5,082,716 | 1/1992 | Satterfield et al. | 428/175 |
| 5,089,328 | 2/1992 | Doerer et al. | 428/378.4 |
| 5,120,593 | 6/1992 | Kurihara | 428/174 |
| 5,134,014 | 7/1992 | Zaima et al. | 428/186 |
| 5,275,865 | 1/1994 | Nicolay | 428/174 |
| 5,308,678 | 5/1994 | Tsujimura et al. | 428/182 |
| 5,383,815 | 1/1995 | Kiesel et al. | 454/137 |
| 5,437,919 | 8/1995 | Welich et al. | 442/224 |
| 5,486,256 | 1/1996 | Romesberg et al. | 156/251 |
| 5,494,737 | 2/1996 | Sakai et al. | 428/317.9 |
| 5,503,903 | 4/1996 | Bainbridge et al. | 428/182 |
| 5,823,611 | 10/1998 | Daniel et al. | 296/214 |
| 5,845,458 | 12/1998 | Patel | 52/782.1 |

FOREIGN PATENT DOCUMENTS

| | | |
|---|---|---|
| 393 476 | 10/1990 | European Pat. Off. . |
| 596234 | 5/1994 | European Pat. Off. . |
| 2005894 | 12/1969 | France . |
| 2 701 685 | 8/1994 | France . |
| 38 05 448 | 8/1989 | Germany . |

*Primary Examiner*—Andrew C. Pike
*Attorney, Agent, or Firm*—Brooks & Kushman P.C.

[57] ABSTRACT

A headliner for motor vehicles includes first and second sheets of material in juxtaposition to each other and adapted for positioning in a mold having two mold portions. The material of at least one of the sheets is fluid deformable with respect to another of the sheets, and is attachable to the material of the other of the sheets by the mold portions at sufficient locations to outline a potential duct between the sheets. The potential duct is adapted to receive fluid between the sheets for forming an actual duct. When fluid is received between the sheets, the material of the at least one sheet is deformed with respect to the material of the other of the sheets to define the actual duct. In one embodiment of the headliner, at least one head impact block is disposed in the duct. The headliner may also include at least one substantially air-impermeable layer disposed within the duct and attached to at least one of the the first and second sheets. Furthermore, the layer preferably includes a polymer powder.

26 Claims, 6 Drawing Sheets

STRUCTURAL HEADLINER

CROSS-REFERENCE TO RELATED APPLICATIONS

This application is a continuation-in-part of application Ser. No. 08/801,853, which was filed on Feb. 21, 1997, and is now abandoned.

TECHNICAL FIELD

This invention relates to headliners for motor vehicles and, more particularly, to a twin-sheet blow-molded headliner.

BACKGROUND ART

Headliners for motor vehicles are mounted inside the passenger compartment and against the sheet metal roof of the vehicle to provide an aesthetic covering for the sheet metal. Conventionally, headliners were constructed of a single layer. More recently, headliners comprising multiple layers laminated together have been proposed.

U.S. Pat. No. 4,131,702, for example, describes a self-supporting molded headliner formed of a layered composite arrangement of polyethylene foam panels laminated on both sides to a reinforcing layer of rigid paperboard. Similarly, U.S. Pat. No. 5,503,903 shows a headliner including front and back sheets of wood fibers and polypropylene laminated with an intermediate corrugated sheet, while U.S. Pat. No. 4,020,207 shows a multiple-layer structure comprising two sheets of polyethylene foam bonded with a reinforcing polymer-containing layer.

Another known headliner construction includes top and bottom sheets attached together to form a duct in the rear portion of the headliner. The top sheet includes a corrugated cardboard layer sandwiched between two perforated polymer layers which allow moisture to pass therethrough. Furthermore, the top sheet is preformed by compression molding before being attached to the bottom sheet.

However, a need exists for a structural headliner in which a front-to-rear air duct is integrally formed, and a particular need exists for such a headliner having increased noise absorbing properties.

SUMMARY OF INVENTION

The present invention is a headliner for motor vehicles having an integrally formed front-to-rear air duct. In one embodiment of the invention, the headliner comprises first and second sheets of material in juxtaposition to each other and adapted for positioning in a mold having two mold portions. The material of at least one of the sheets is fluid deformable with respect to the other of the sheets and is attachable to the material of the other of the sheets by the mold portions at sufficient locations to outline a potential duct between the sheets. The potential duct is adapted to receive fluid between the sheets for forming an actual duct. The material of the at least one sheet is deformed with respect to the material of the other of the sheets to define the actual duct when fluid is received between the sheets.

In another embodiment of the invention, the headliner comprises a first sheet having a front and first and second sides. A second sheet is attached to the first sheet at at least one point between the first and second sides to define a duct extending from a point generally proximate the front side of the first sheet. Additionally, a head impact block is disposed in the duct.

In yet another embodiment of the invention, the headliner comprises a first sheet having a front and first and second sides. A second sheet is attached to the first sheet at at least one point between the first and second sides to define a duct extending from a point generally proximate the front side of the first sheet. A substantially air-impermeable layer lines the first and second sheets within the duct, and the layer comprises polymer powder.

Accordingly, it is an object of the present invention to provide a headliner of the type described above having an integrally formed front-to-rear air duct.

Another object of the present invention is to provide a headliner of the type described above which has increased noise absorbing properties.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
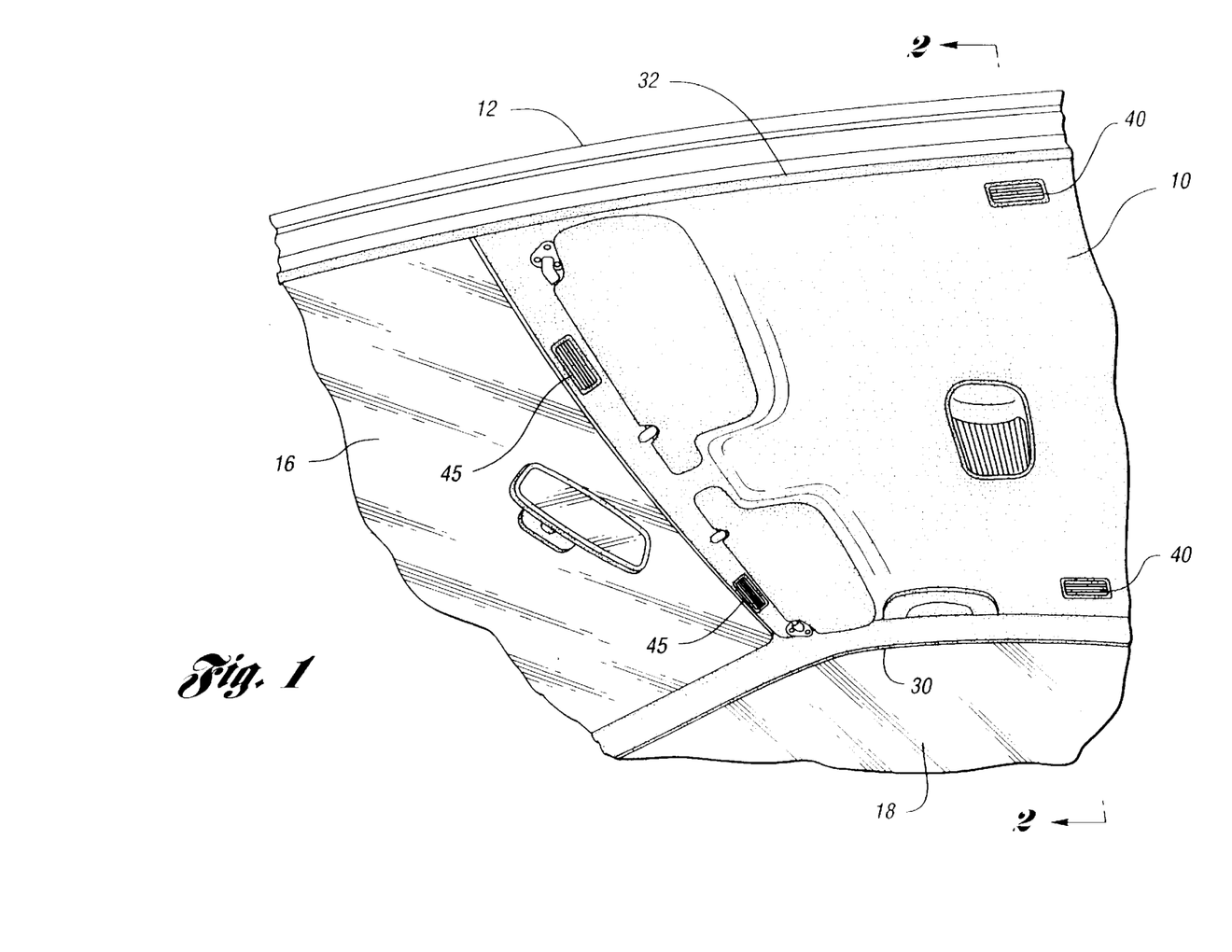
FIG. 1 is a perspective view of the interior of a motor vehicle including a headliner according to the present invention.
Figure 2:
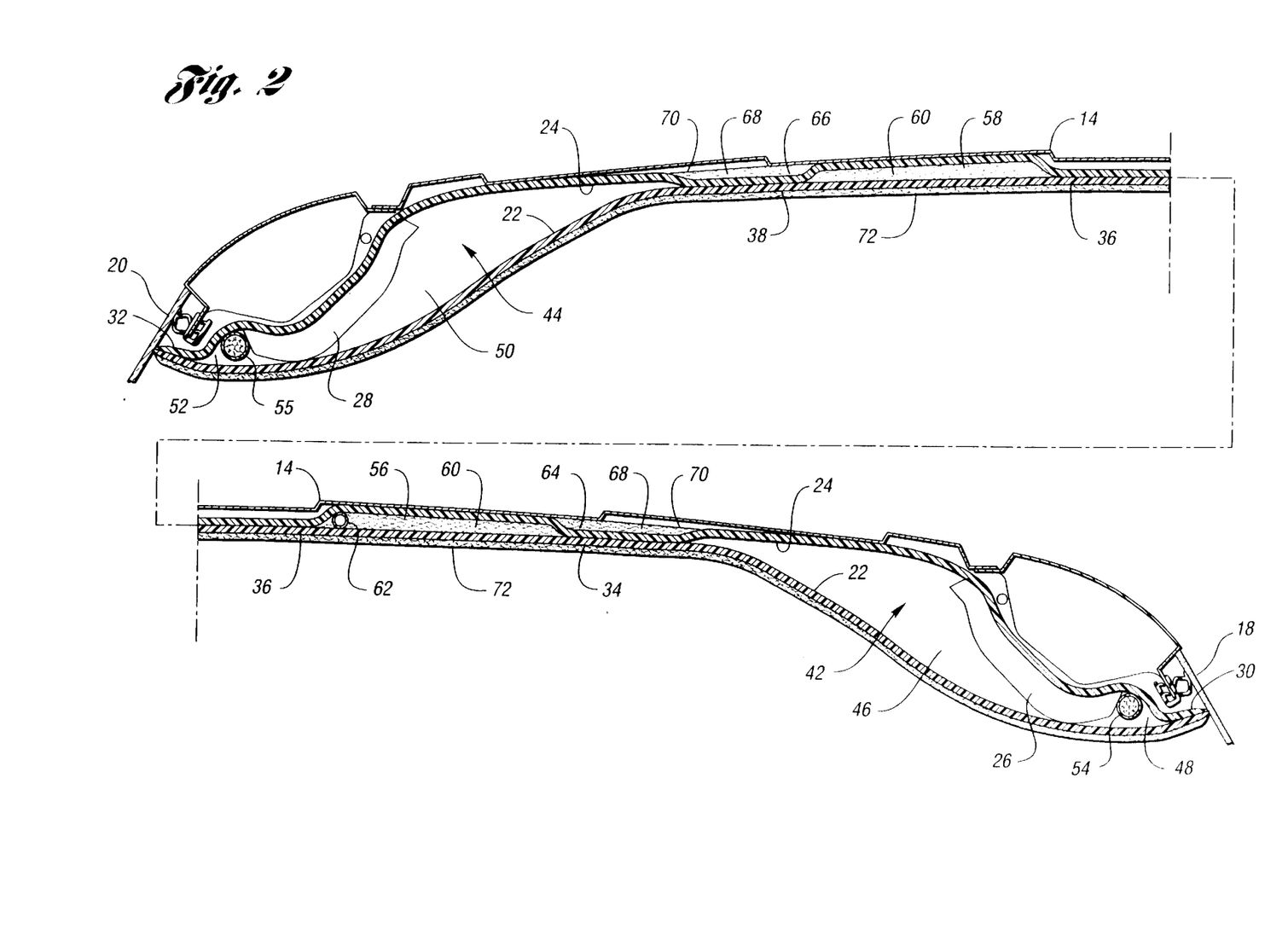
FIG. 2 is a cross-sectional view taken along line 2—2 in FIG. 1.

With reference to the drawings, the preferred embodiments of the present invention will be described. FIGS. 1 and 2 show a headliner 10 according to the present invention for use in the interior of a motor vehicle 12. As is conventional, the headliner 10 covers the sheet metal roof 14 of the vehicle rearwardly from the front windshield 16 and substantially between the side windows 18 and 20.

The headliner 10 comprises a generally rectangular first sheet 22, a generally rectangular second sheet 24, and a pair of head impact members such as blocks 26 and 28. The first sheet 22 is typically the innermost sheet when the headliner 10 is in its normal orientation during usage as shown in FIGS. 1 and 2, while the second sheet 24 is typically the outermost sheet. The outer sheet 24 is attached to the inner sheet 22 along their opposed sides 30 and 32, and also along three fused ribs 34, 36, and 38 which extend generally longitudinally in parallel with the sides of the headliner. The ribs provide relatively high strength and rigidity to the headliner 10, allowing it to be handled more efficiently and attached to the sheet metal 14 in a conventional manner but with fewer fasteners or less adhesives.

The ribs 34 and 38 define a pair of generally longitudinal ducts 42 and 44 respectively. The ducts 42 and 44 distribute treated or untreated air circulated from the heating and cooling system of the vehicle, normally from a position generally proximate the front windshield 16 to outlets positioned at various rearward points. This arrangement is particularly desirable in larger vehicles such as vans, minivans, and sport-utility vehicles. The ducts 42 and 44 may also be interconnected, as described more fully below. Thus, the source of the circulated air can be positioned anywhere in communication with one of the ducts, and air can be distributed to vents 40 situated at any other point in the vehicle. One or more outlets 45 may be provided proximate the front windshield 16, for example, so that air can be directed to defrost the front windshield. Additional outlets may be provided proximate the side and rear windows to defrost those surfaces. With this arrangement, defrosting of such surfaces advantageously commences at the top of each surface and progresses downwardly.

The head impact blocks 26 and 28 preferably comprise urethane or polypropylene foam, polyethylene, or expanded beads, and are respectively disposed in the ducts 42 and 44 proximate the upper ends of the side windows 18 and 20. Each of the head impact blocks is disposed adjacent either the inner sheet 22 or the outer sheet 24. Preferably, the head impact blocks 26 and 28 each abut and extend between the inner sheet 22 and the outer sheet 24 to provide further strength and rigidity to the headliner 10.

With this arrangement, each of the head impact blocks 26 and 28 also defines a pair of lateral subducts, respectively 46, 48 and 50, 52. The lateral subducts 46, 48 and 50, 52 lie generally proximate the opposite side windows 18 and 20 of the vehicle. Various structure such as wire harnesses 54 and 55 may be disposed in the lateral subducts.

The ribs 34, 36, and 38 also define a pair of sound deadening cavities 56 and 58 that extend the length of the headliner. Means such as microfibers 60 are preferably disposed in the cavities 56 and 58, and act to absorb sound of relatively high frequencies. A fluid conduit 62, such as one to carry windshield cleaning fluid to the rear windshield of the vehicle, may also be disposed in any of the ducts or, as shown in FIG. 2, in the cavity 56.

The outer sheet 24 also includes a pair of recesses 64 and 66 indented below the plane defined by the surface of the central portion of the outer sheet and generally coincidental with the ribs 34 and 38. Means such as fibers 68 are optionally disposed in the recesses 64 and 66. With the fibers 68 and a reflective or heat insulating film or foil 70, such as Mylar® polyester film also disposed in the recesses 64 and 66, the recesses act as a diaphragm to deaden the sound of relatively low frequencies. To facilitate this process, the recesses 64 and 66 may run the full length of the headliner, or may be specifically shaped and placed over either surface of the headliner according to the acoustical properties of the particular vehicle and/or headliner combination. The headliner 10 may be attached to the sheet metal roof 14 of the vehicle by any conventional method, with the front end thereof generally proximate the front windshield 16. An aesthetic material such as cloth 72 bonded to the inner sheet 22 may be provided with perforations to enhance the sound deadening properties of the headliner 10.

Figure 3:
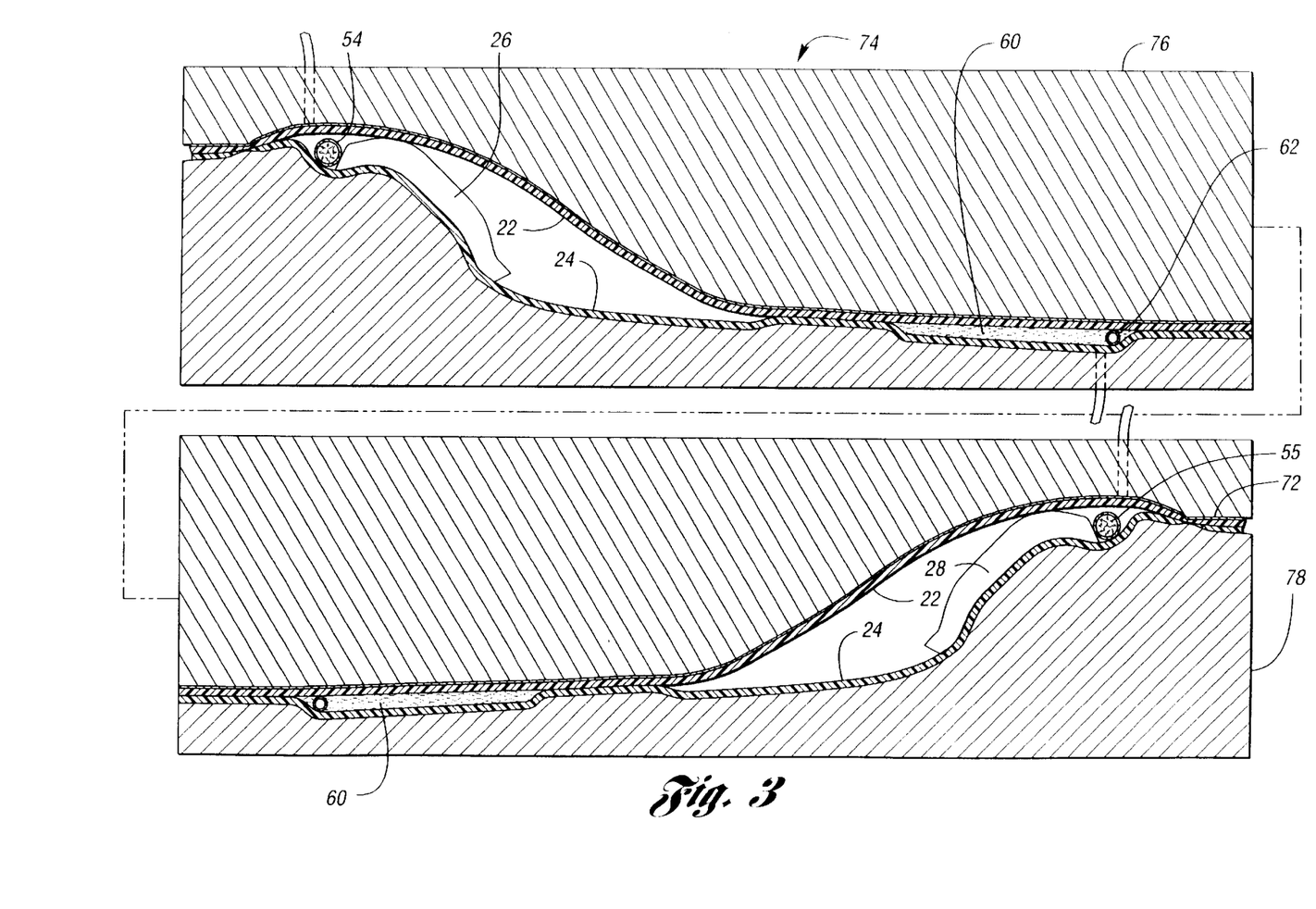
FIG. 3 is a cross-sectional view of a twin-sheet blow mold used to form the headliner.

The headliner 10 is advantageously formed by a novel twin-sheet blow-molding process in which the outer sheet 24, comprising a fluid deformable thermoplastic material such as glass reinforced thermoformable rigid urethane (TRU) or high density polyethylene, is first preheated. The elements such as the head impact blocks 26 and 28, the wiring harnesses 54 and 55, the microfibers 60, and the fluid conduit 62 are then indexed onto the outer sheet 24, and the outer sheet is introduced into a mold 74 shown in FIG. 3. The inner sheet 22, which also comprises a fluid deformable thermoplastic material and has the cloth 72 already bonded thereto, is then positioned adjacent the outer sheet 24. Mold halves 76 and 78 are then closed thereby attaching the inner and outer sheets 22 and 24 together along their opposed sides 30 and 32, and along the three fused ribs 34, 36, and 38. Next, a fluid, normally compressed air, is introduced between the sheets 22 and 24 at a positive relative pressure of about 80 pounds per square inch to form the headliner 10. During the forming process, at least one of the sheets 22 and 24 is deformed with respect to the other of the sheets 22 and 24 to define the ducts 42 and 44 and subducts 46, 48, 50, and 52. Alternatively, or in addition to introducing fluid between the sheets 22 and 24, a negative pressure may be developed at the surfaces of one or both of the mold halves 76 and 78 to assist in forming the headliner 10.

Figure 4:
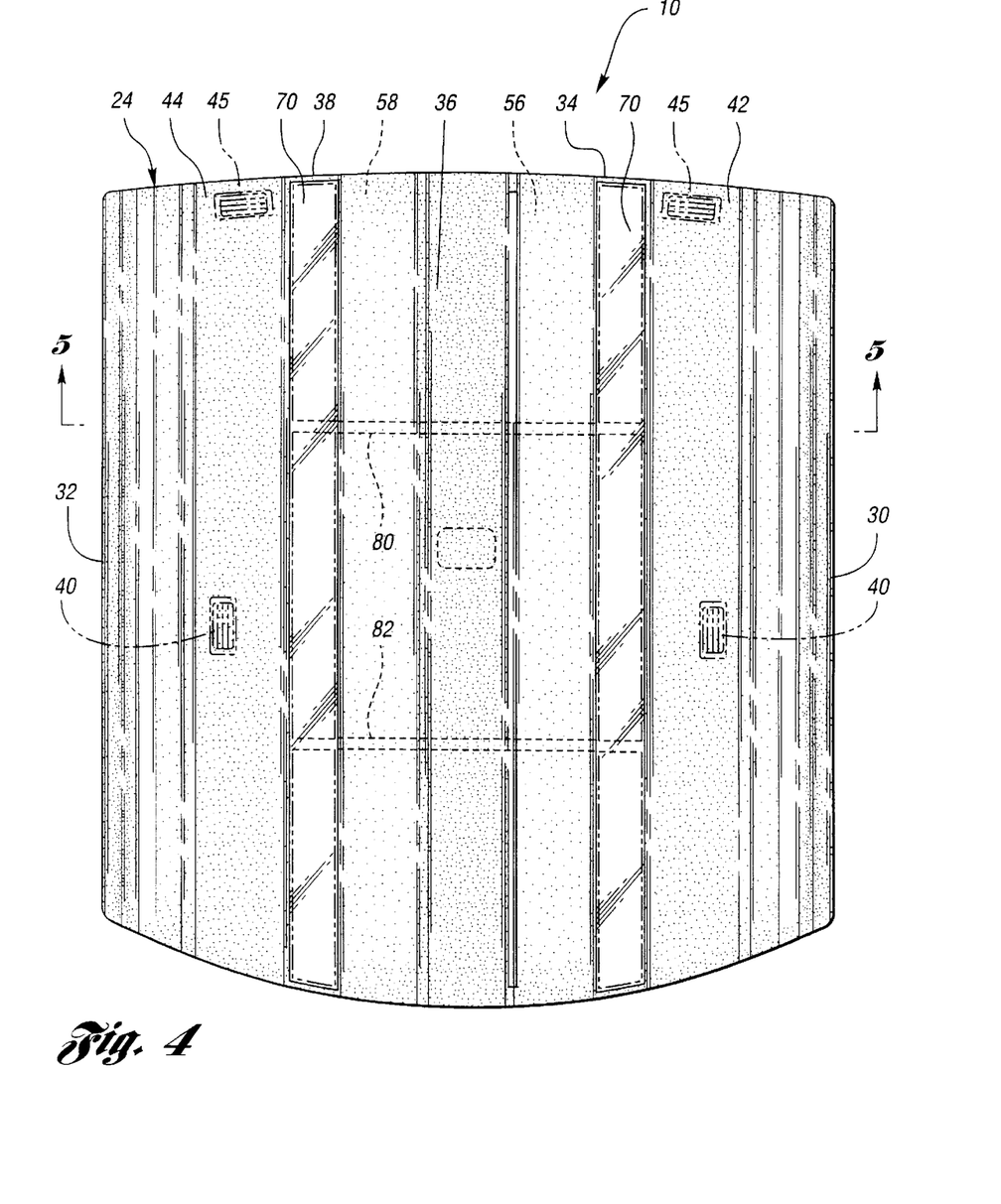
FIG. 4 is a top view of the headliner prior to installation in the vehicle.
Figure 5:
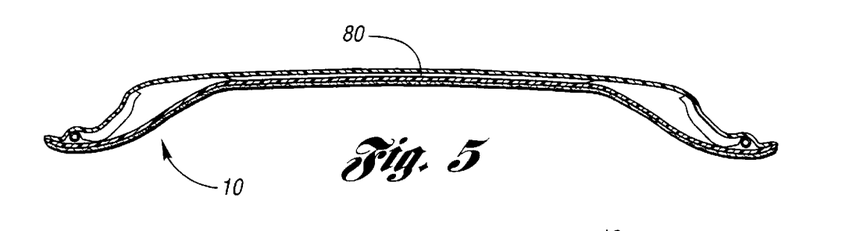
FIG. 5 is a cross-sectional view of the headliner taken along line 5—5 in FIG. 4.

As shown in FIGS. 4 and 5, one or more generally lateral portions 80 and 82 are formed through each of the ribs 34, 36, and 38. The portions 80 and 82 allow a cross flow among the air ducts. The provision of the portions 80 and 82 also permits the use of as few as two blow inlets when the headliner 10 is formed. Because the sheets 22 and 24 are slightly porous, a slight vacuum may be generated at the surfaces of one or both of the mold halves 76 and 78 to ensure that the cross flow portions 80 and 82 are kept open. The cycle time is preferably about 50 seconds, during which time the sheets 22 and 24 are fused together by the thermoforming process to form a unitary structure. To ensure that the part does not warp, the mold halves 76 and 78 may be cooled at different rates because the cloth 72 acts as an insulator. When the headliner 10 is formed by this process, minimal or no division line is presented on the show surface of the cloth 72 at the point of contact between the head impact blocks and the inner sheet 22.

The fibers 68 and the foil 70 are optionally added to the headliner 10 in a post-molding operation. A paper or other backing may be applied to the back side of the outer sheet 24 prior to the deposition of the fibers 68 to inhibit adhesion of the fibers to the thermoplastic and facilitate the formation of an air gap between the sheet 24 and the foil 70.

Figure 6:
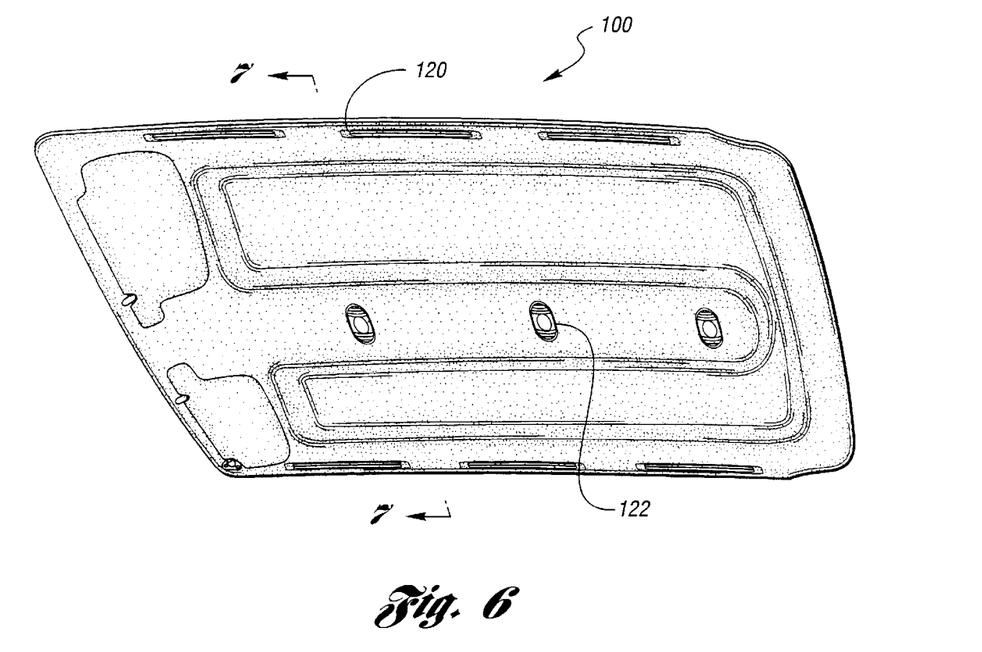
FIG. 6 is a perspective view of a first alternative embodiment of the headliner.
Figure 7:
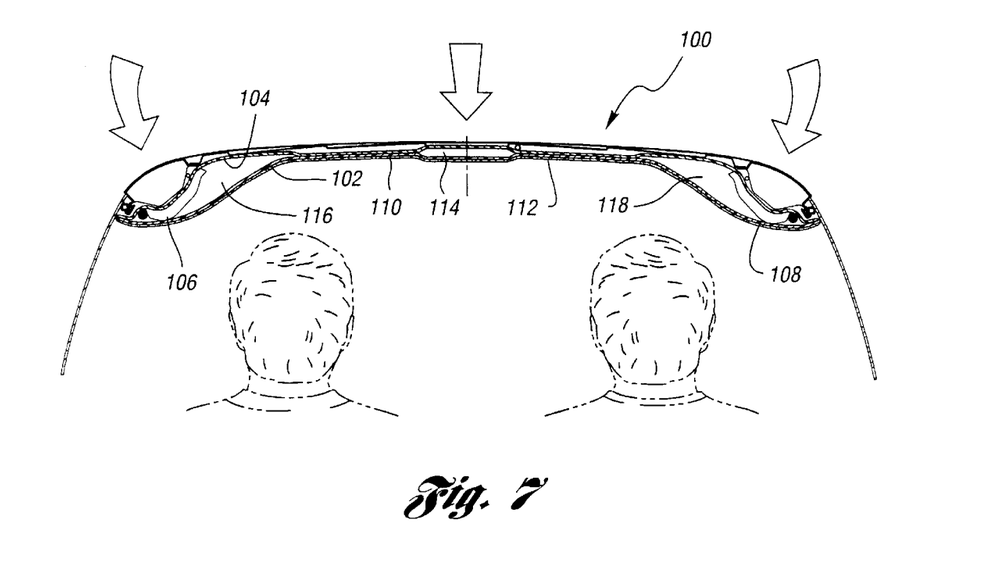
FIG. 7 is a cross-sectional view taken along line 7—7 in FIG. 6.

FIGS. 6 and 7 show a first alternative embodiment 100 of the headliner. Like the headliner 10, the headliner 100 includes an inner sheet 102, and outer sheet 104, and a pair of head impact blocks 106 and 108. The inner sheet 102 is attached to the outer sheet 104 along their outer sides and also along two ribs 110 and 112. The ribs 110 and 112 define a longitudinal center duct 114 and a pair of longitudinal side ducts 116 and 118. In a preferred embodiment, hot air is circulated through the ducts 116 and 118 to outlets 120 proximate the sides of the headliner, while fresh or cooled air is circulated through the center duct 114 to outlets 122. Thus, heated air can be circulated to one location in the vehicle, and fresh or cooled air can be circulated contemporaneously to another location.

Figure 8:
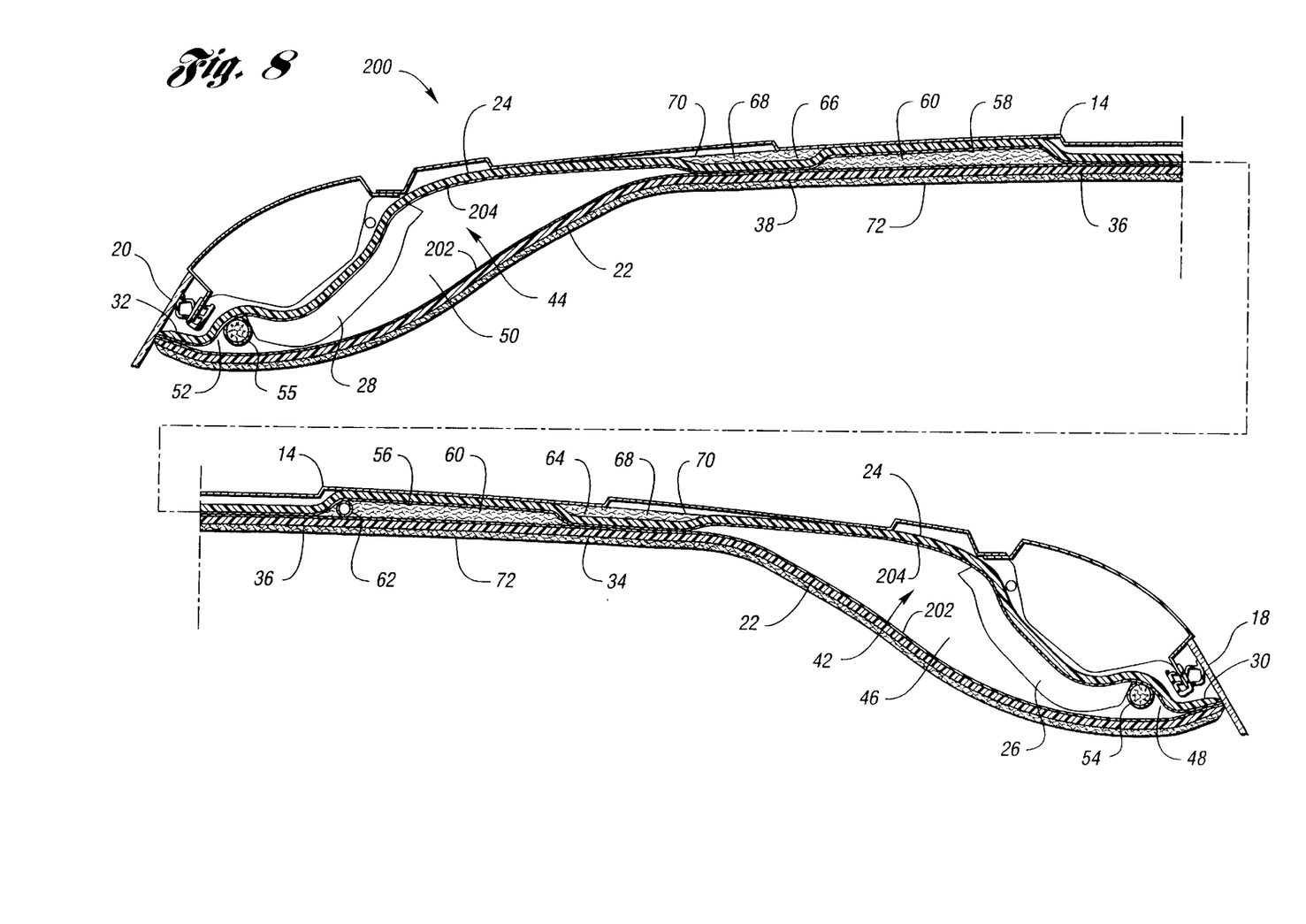
FIG. 8 is a cross-sectional view similar to FIG. 2 of a second alternative embodiment of the headliner.

FIG. 8 shows a second alternative embodiment 200 of the headliner. In addition to having the features of the headliner 10, the headliner 200 also includes first and second substantially air-impermeable layers 202 and 204 bonded to the inner and outer sheets 22 and 24, respectively. The air-impermeable layers 202 and 204 improve air flow efficiency within the ducts 42 and 44 by minimizing flow losses to the inner and outer sheets 22 and 24. The air-impermeable layers 202 and 204 are preferably made of a polymer powder which comprises such materials as polyester, polyethylene, polypropylene, and/or nylon. Alternatively, one or both of the air-impermeable layers 202 and 204 may comprise an air-impermeable polymer film made of such materials as polyester, polyethylene, polypropylene, and/or nylon. The layers 202 and 204 are also preferably substantially moisture impermeable to prevent moisture from entering the ducts 42 and 44, and/or to prevent moisture from passing from the ducts 42 and 44 into the headliner 200. Furthermore, at least one of the air-impermeable layers 202 and 204 also preferably comprises a heat-activatable adhesive, and extends between the inner and outer sheets 22 and 24 along the opposed sides 30 and 32 of the sheets 22 and 24, and also along the three fused ribs 34, 36, and 38. The heat activatable adhesive improves attachment of the inner and outer sheets 22 and 24. Alternatively, air-impermeable layers may be provided on both sides of each of the first and second sheets 22 and 24.

The headliner 200 may be formed in a manner similar to that described with respect to the headliner 10, except that the inner and outer sheets 22 and 24 are preferably pre-laminated with the first and second air-impermeable layers 202 and 204, respectively. Alternatively, air impermeable layers may be pre-applied to both sides of each of the inner and outer sheets 22 and 24. For air-impermeable layers 202 comprising a polymer powder, the powder may also be used to bond materials within each of the first and second sheets 22 and 24. For example, if the first and second sheets 22 and 24 comprise TRU, which may include one or more fiberglass layers bonded to a urethane core, the polymer powder may be used to bond chopped fiberglass together within the fiberglass layers, as well as to bond the fiberglass layers to the urethane cores. The inner and outer sheets 22 and 24 are then preheated, and the blow-molding process is continued as previously described. Alternatively, one or more air impermeable layers may be bonded to the headliner 200 during the blow-molding process. By using such a process to form the headliner 200, elements such as the wiring harnesses 54 and 55, the microfibers 60, and the fluid conduit 62 may be captured between and/or encapsulated by the first and second sheets 22 and 24.

It should be understood that while the forms of the invention herein shown and described constitute preferred embodiments of the invention, they are not intended to illustrate all possible forms thereof. For example, the ribs 34, 36, and 38 can be formed as series of intermittent longitudinal knit points, with the second sheet being attached to the first sheet at one or more points along the sides of the first sheet and at at least one point along the inner side of the first sheet. Similarly, the sheets 22 and 24 need not be fused to each other along their edges. Instead, the edges of the sheets 22 and 24 may be fitted into a side molding. It should also be understood that the words used are words of description rather than limitation, and various changes may be made without departing from the spirit and scope of the invention disclosed.

What is claimed is:

1. A headliner for motor vehicles, the headliner comprising:

first and second sheets of material in juxtaposition to each other and adapted for positioning in a mold having two mold portions, the material of at least one of the sheets being fluid deformable with respect to another of the sheets and being attachable to the material of the other of the sheets by the mold portions at sufficient locations to outline a potential duct between the sheets, the potential duct being adapted to receive fluid between the sheets for forming an actual duct;

wherein the material of the at least one sheet is deformed with respect to the material of the other of the sheets to define the actual duct when the fluid is received between the sheets.

2. The headliner of claim 1 further comprising a head impact member disposed in the duct.

3. The headliner of claim 2 wherein the head impact member abuts the first and second sheets to define a second duct.

4. The headliner of claim 3 further comprising a wire harness disposed in the second duct.

5. The headliner of claim 1 wherein the second sheet includes a recess.

6. The headliner of claim 5 further comprising material disposed in the recess for deadening sound.

7. The headliner of claim 5 further comprising fibers disposed in the recess.

8. The headliner of claim 5 further comprising a film disposed in the recess.

9. The headliner of claim 1 wherein the second sheet is attachable to the first sheet by the mold portions at sufficient additional locations to define a cavity.

10. The headliner of claim 9 further comprising microfibers disposed in the cavity.

11. The headliner of claim 9 further comprising a fluid conduit disposed in the cavity.

12. The headliner of claim 1 further comprising at least one substantially air-impermeable layer disposed within the duct and attached to at least one of the group consisting of the first and second sheets.

13. The headliner of claim 12 wherein the at least one layer comprises a polymer powder.

14. The headliner of claim 1 further comprising first and second substantially air-impermeable layers attached to the first and second sheets, respectively, and disposed between the first and second sheets.

15. The headliner of claim 1 further comprising an aesthetic material attached to the first sheet, the aesthetic material including perforations to attenuate sound.

16. A headliner for motor vehicles, the headliner comprising:

a first sheet having a front and first and second sides;

a second sheet attached to the first sheet at at least one point between the first and second sides to define a duct extending from a point generally proximate the front side of the first sheet; and a head impact block disposed in the duct.

17. The headliner of claim 16 wherein the head impact block abuts the first and second sheets.

18. The headliner of claim 17 wherein the head impact block abuts the first and second sheets to define a second duct.

19. The headliner of claim 18 further comprising a wire harness disposed in the second duct.

20. The headliner of claim 16 wherein the head impact block comprises urethane.

21. The headliner of claim 16 wherein the head impact block comprises polypropylene.

22. A headliner for motor vehicles, the headliner comprising:

a first sheet having first and second sides;

a second sheet attached to the first sheet at at least two series of points between the first and second sides of the first sheet to define at least two first ducts, the second sheet also being attached to the first sheet at at least one point along the first side of the first sheet and at at least one point along the second side of the first sheet; and a head impact block disposed in each of the at least two first ducts, the head impact blocks each abutting the first and second sheets to define at least two second ducts.

23. A headliner for motor vehicles, the headliner comprising:
- a first sheet having a front and first and second sides;
- a second sheet attached to the first sheet at at least one point between the first and second sides to define a duct extending from a point generally proximate the front side of the first sheet; and
- a substantially air-impermeable layer lining the first and second sheets within the duct, the layer comprising polymer powder.

24. The headliner of claim 23 wherein the substantially air-impermeable layer comprises first and second substantially air-impermeable layers attached to the first and second sheets, respectively.

25. The headliner of claim 24 wherein at least one of the layers comprises a heat-activatable adhesive and further extends between the first and second sheets to the at least one point of attachment of the first and second sheets.

26. The headliner of claim 24 wherein at one of the layers is configured as a moisture barrier to impede passage of moisture therethrough.

* * * * *